United States Patent [19]

Farver

[11] Patent Number: 4,947,247

[45] Date of Patent: Aug. 7, 1990

[54] DISPLACEMENT MEASUREMENT APPARATUS AND METHOD FOR AN AUTOMATED FLOW ROTAMETER

[75] Inventor: Theodore B. Farver, Windsor Locks, Conn.

[73] Assignee: Combustion Engineering, Inc., Windsor, Conn.

[21] Appl. No.: 369,084

[22] Filed: Jun. 20, 1989

[51] Int. Cl.⁵ .............................................. H04N 7/18
[52] U.S. Cl. ................................... 358/107; 358/101; 364/509
[58] Field of Search ....................... 358/101, 107; 73/3, 73/4 R, 861.49, 861.51, 861.56, 861.57; 364/509, 510, 550

[56] References Cited

U.S. PATENT DOCUMENTS

| | | | |
|---|---|---|---|
| 3,578,906 | 5/1971 | Holmstrom et al. | 358/107 |
| 3,621,130 | 11/1971 | Paine | 358/107 |
| 3,679,820 | 7/1972 | Montone | 358/107 |
| 3,909,519 | 9/1975 | Page, Jr. | 358/107 |
| 4,361,830 | 11/1982 | Honma et al. | 358/107 |
| 4,570,903 | 2/1986 | Crass | 251/129.72 |
| 4,604,963 | 8/1986 | Kirkman | 358/107 |
| 4,805,451 | 2/1989 | Leon | 73/168 |
| 4,837,708 | 6/1989 | Wright | 358/107 |

Primary Examiner—John K. Peng
Attorney, Agent, or Firm—Chilton, Alix & Van Kirk

[57] ABSTRACT

A camera is mountable near the target for generating a composite video signal including the target and a region extending along a predetermined direction from the target. A video signal converter is associated with the camera, for separating the video signal into horizontal and vertical digital data points associated with arbitrary horizontal and vertical axes in the camera. The horizontal data points and the vertical data points are spaced apart by a horizontal unit pitch and a vertical unit pitch, respectively. One of the arbitrary axes is aligned with the predetermined direction of target movement, and calibration establishes a quantitative relation between the unit pitch of the video signal data points along one aligned axis and a known distance along the predetermined direction. The number of digital data points are counted between a reference position of the target and a displaced position of the target on the aligned axis, which is commensurate with the displaced position of the target.

9 Claims, 3 Drawing Sheets

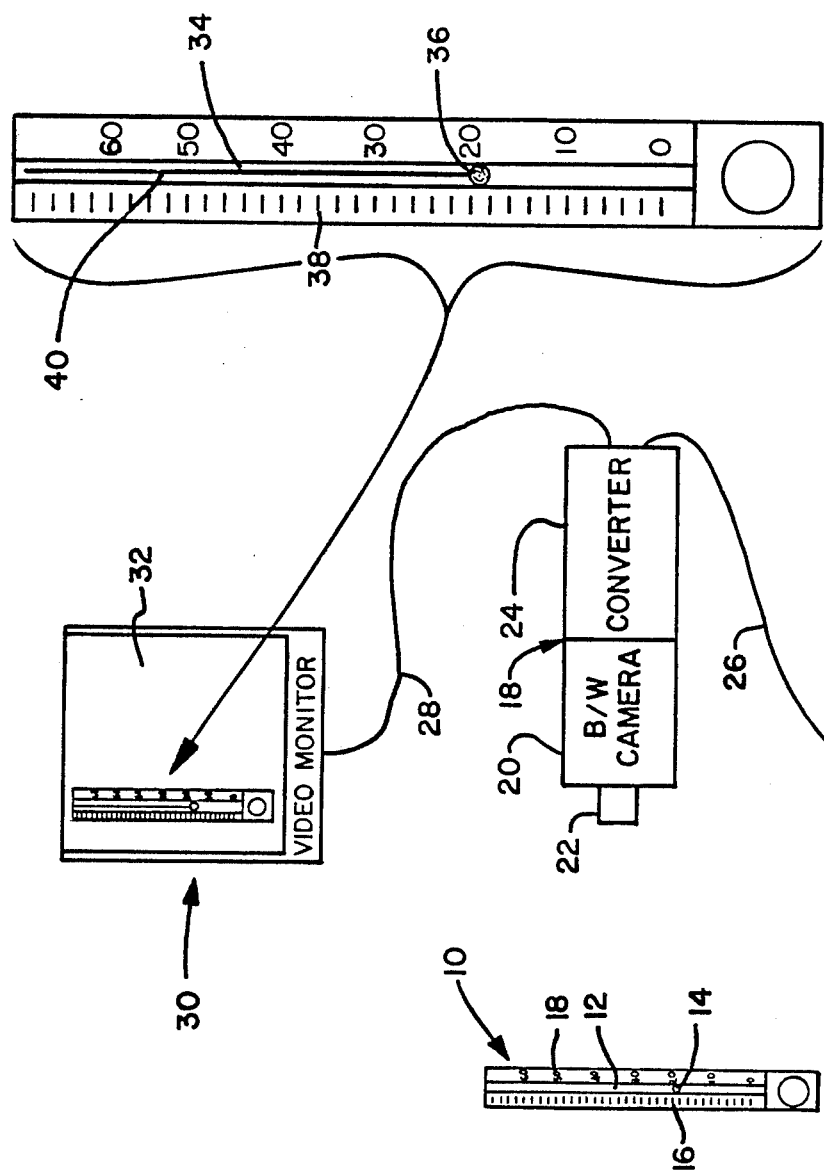

DISPLACEMENT MEASUREMENT APPARATUS AND METHOD FOR AN AUTOMATED FLOW ROTAMETER

BACKGROUND OF THE INVENTION

The present invention relates to displacement measuring devices, and more particularly, to a low cost video system for monitoring the position of a float or similar target member associated with a flow measurement or control device.

A flow rotameter operates by allowing a gas or liquid to pass through a tube and move a float up or down proportionately to flow. The flow rate is determined by the position of the float relative to the scale on the tube. This type of flow meter is simple and inexpensive, and has been used regularly in various industries because it is also extremely reliable. Its major disadvantage is that a human is required to visually read the float position and manually record data for further evaluation or incorporation into a database system.

The basic problem associated with the flow rotameter also occurs in other circumstances where a physical target is connected to or adapted to move in a predetermined, linear direction in response to changes in a process condition. Equivalently, the target may move linearly as a result of action taken to control the process, e.g., stem displacement in the operator of a pneumatic valve.

SUMMARY OF THE INVENTION

It is an object of the present invention to provide apparatus and method for remotely yet accurately acquiring position or displacement data of a physical target adapted to move in a predetermined direction in response to changes in a process condition.

This is accomplished in accordance with the present invention by a low cost video system which monitors the position of the target member with a camera and provides an output signal commensurate with the displacement. In the apparatus embodiment, the invention includes a camera mountable near the target for generating a composite video signal including the target and a region extending along the direction of movement of the target. A video signal converter is associated with the camera and includes means for separating the video signal into horizontal and vertical digital data points. The vertical data points define an arbitrary vertical axis which is aligned with the direction of target movement. The displacement of the target is determined by electronically counting the number of vertical data points, or scan lines, between a reference position of the target and a displaced position of the target along the column of vertical data points. In the rotameter embodiment, the number of scan lines in the converted video signal are counted between the no-flow reference position of the target and the actual position of the target as the target moves or changes in response to the flow rate.

In the preferred embodiment, a video monitor is associated with the converter for generating an image display to the user. The converter injects a vertical line on the calibration monitor that helps the user align the "counter" column of video data points with the target path. The monitor can also be used to establish a quantitative relation between the unit pitch of the video signal data points in, typically, the vertical direction, and a known absolute distance along the predetermined direction of target movement.

In the method embodiment, the steps include mounting a camera so that the field of view includes the target and the region surrounding the target along the direction of target movement, and generating a composite video signal from the camera. The video signal is separated into digitized horizontal rows and vertical columns of data points. One of the vertical columns of digitized data points is aligned with the line of movement of the target. The number of vertical data points between a reference position of the target and a displaced position of the target are counted as the target moves in response to changes in the process. An output signal is then generated commensurate with the counted data points. The output signal can be in digital form for storage as a binary number to be uploaded to a computer or input to a character generator on a video monitor, or the output signal can be in analog form for display on a panel meter or the like.

The apparatus and method in accordance with the invention provide numerous advantages relative to the conventional monitoring techniques, the most important of which is the elimination of a human technician for gathering data. This not only reduces labor costs, but also reduces the possibility for recording and transcription errors. The output signal allows simple remote reading of flow rotameters and similar devices with computers, data loggers, or panel meters. The invention is easily installed, without the need to modify existing flow rotameters. All that is required is sufficient room for the permanent mounting of the camera and associated converter.

The calibration monitor can be removed from the system after initial installation and calibration of the camera and converter, but if desired, it can remain to provide a continuous remote visual display of the flow rotameter.

Due to the electronic operation of the invention, the data can be quickly updated, for example at a rate of 30-60 times per second.

BRIEF DESCRIPTION OF THE DRAWINGS

These and other objects and advantages of the invention will become more evident from the following description of the preferred embodiment, made with reference to the accompanying drawings in which:

FIG. 1 is a schematic representation of a flow rate rotameter in conjunction with the present invention;

FIG. 2 is an enlarged view of a portion of the video monitor display showing FIG. 1;

DESCRIPTION OF THE PREFERRED EMBODIMENT

Figure 3:
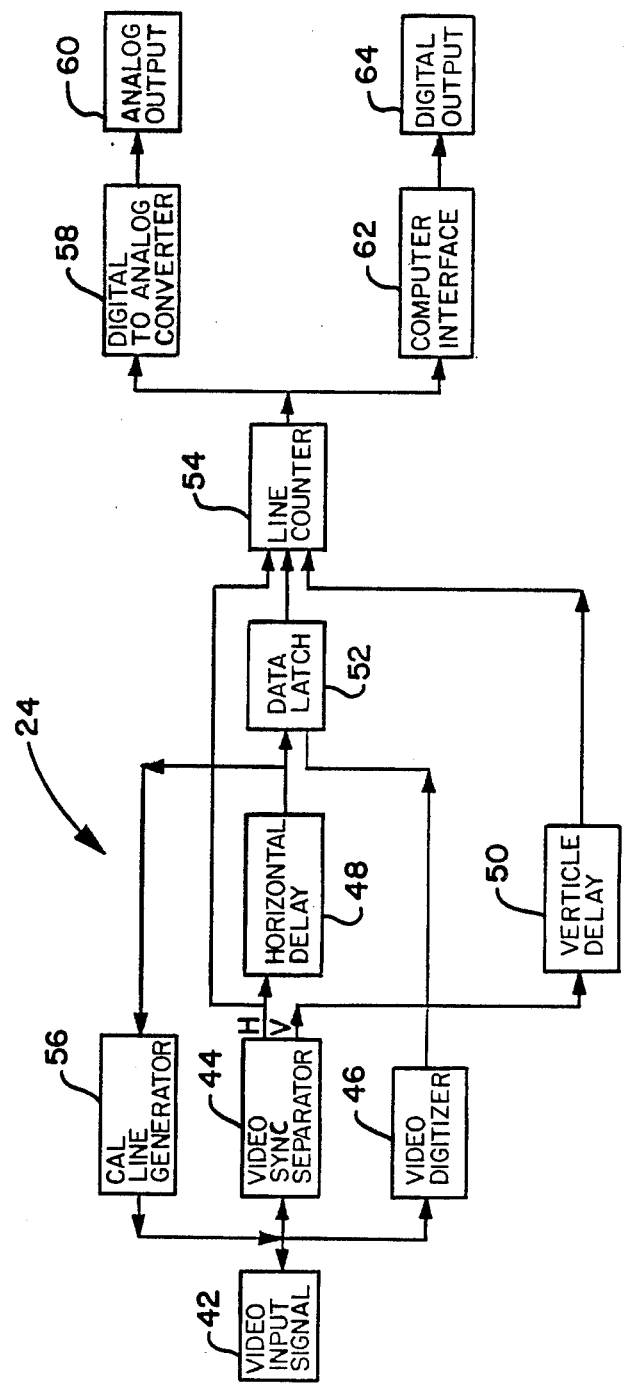
FIG. 3 is a block diagram of the electronics associated with the converter in accordance with the invention.

FIG. 1 shows a flow rotameter 10 of a conventional design, wherein a flotation tube 12 is in fluid communication with a process fluid flow line in a power plant or the like (not shown), and a flotation member 14 is situated within tube 12 for linear displacement in accordance with the flow rate in the line. A series of gradations 16 are typically provided on one side of the tube 18 and numeric values indicative of a measured quantity, such as flow rate, are provided at 18 on the other side of the tube 12. Conventionally, the position of the floating member 14 within the tube is observed by a human technician who records the value for subsequent use.

In accordance with the invention, a black and white camera 20 is secured to a support structure (not shown) adjacent the rotameter 10 such that the field of view of the lens 22 includes the target, i.e., the flotation member 14, and a region extending along the direction of movement of the target, (i.e., the full extent of tube 12). The composite video signal generated by the camera is delivered to converter 24. The converter 24 is typically attached to the camera but this is not necessary. The converter modifies the video signal in a manner to be more fully described in connection with FIGS. 3 and 4, but for present purposes, it is sufficient to understand that the converter output includes a signal commensurate with the displacement of target 14 relative to a reference position, in a form that may be used in an analog device such as a meter, or in digital form that may be stored on magnetic media or delivered directly to a computer for storage in a database on the like. Optionally, the converter may also deliver a signal on line 28 to an image display monitor 30 usable by the technician for initially calibrating the rotameter or the video monitor may be permanently located in a control room to permit continuous observation of the float movement.

FIG. 2 is a schematic enlargement of the image 32 observable on the video monitor 30. The technician can thus see the image of the vertical tube 34 with the flotation or target member 36 therein, along with the displacement scale 38. For reasons to be described more fully below, the converter 24 preferably injects a phantom calibration line 40 to be centered within the tube image 34 so as to pass through the image of the target 36.

Figure 4:
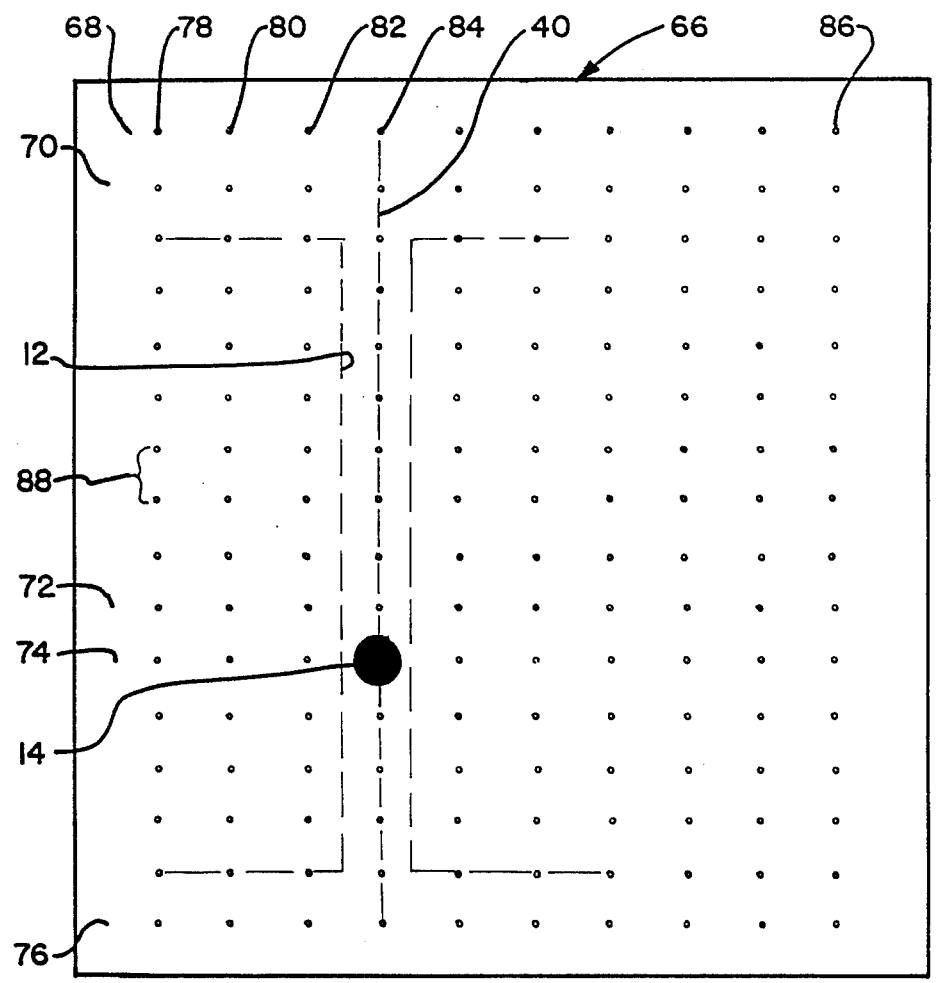
FIG. 4 is a schematic illustration of the manner in which the digitized video signal is delayed so that the lines or pixels indicative of target displacement may be counted.

FIG. 3 is a block diagram of converter 24 in accordance with the preferred embodiment. The video input signal from the camera 20 is input to the video synchronization separator 44, which separates the horizontal and vertical components of the video signal, each of which is separately delivered for subsequent processing. The horizontal signal is delivered to a horizontal delay circuit 48 and the vertical signal is delivered to vertical delay circuit 50. The purpose of these delays is to permit the latching of data at 52 from only that portion of the video signal which can be influenced by the movement of the target 14. The data latch at 52 is accomplished as a result of the digitization of the video signal in the vertical column of video data points which can be influenced by the movement of the target 14. The result of the data latch operation is a determination of when a sequence of identical binary values is interrupted by the other value, i.e., when the target produces a black binary value within a series of white binary values in the vertical tube. The relative vertical position of the black value, is determined based on counting the number of scan lines above or below the target, or relative to some reference point. An output signal is then generated commensurate with the number of points counted, either through a digital converter 58 to produce an analog output 60, or through a computer interface 62 to produce a digital output 64.

Circuit 56 receives input from the horizontal delay circuit 48 and generates a calibration line for the purpose of assuring that the horizontal delay, data latch and line counting will occur with respect to a sequence of data points in the video signal corresponding to the tube 12 and target 14. Preferably, this calibration is achieved in conjunction with a video image signal 42 delivered to the monitor 30 (see FIGS. 1 and 2) such that the phantom calibration line 40 is displayed to the user. The calibration line may be adjusted by the user to assure that when the line 40 is situated within tube 34 and passes through target 36 as viewed in the image 32 of monitor 30, the circuits 44–54 in FIG. 3 perform the data latch and line counter operations on the video signal corresponding to tube 12 and target 14.

It should be appreciated that in the lowest cost system, the video signal is handled in a manner typical of home television signals, i.e., a raster scanning technique in which the video signal is converted into a plurality of horizontal scans 68, 70 . . . 72, 74 . . . 76. In a more costly technique, the video signal is initially digitized and stored in a plurality of addresses, each corresponding to a row location 68–76 and a particular column location 78, 80, 82, 84 . . . 86. In accordance with the invention, the video signal is calibrated so that the portion thereof shown schematically in FIG. 4, which contains a binary (i.e., black or white) value of the digitized representation of the target 14, and the digitized representation of the linear path which the target follows, i.e., the tube 12, are utilized for displacement measurement. In the raster scanning converter, the delay circuits 48, 50 operate so sufficient time is available during each horizontal scan, to latch the binary value corresponding to the vertically sequential data points in column 84. In a memory addressed video signal converter, the digitization of the entire signal is achieved automatically and only a calibration is necessary to assure that the correct column 84 is used for counting purposes.

It should be appreciated that the calibration operation includes establishing a relationship between the known unit pitch 88 of the video signal data points along, for example, column 84 and the absolute distance on the rotameter tube 12 corresponding to such unit pitch 88. The unit pitch 88 can alternatively be considered equivalent to a video image pixel, although the pitch 88 in the video signal used in the operations represented by circuits 44–54 are of finer gradation than are typically displayed in the video monitor 30.

It should further be appreciated that the particular column within the image space represented at 66, can be arbitrarily chosen. It may be assumed that any of the vertical columns represented by the data points in columns 78, 80, 82, 84 . . . 86 could theoretically serve as the set of data points where the data latching and line counting occur. In a memory addressed type video signal, the counting could occur horizontally within the image space 66. In a more general way, each of the columns and rows represented by the dots in FIG. 4 can be viewed as an arbitrary horizontal or vertical axis. So long as the direction of movement of the target 14 is along one of these axes, the digital counting technique in accordance with the invention can be accomplished. Thus, any one of an arbitrary axis aligned with the predetermined direction of target movement may be selected.

I claim:

1. Apparatus for measuring the linear displacement of a physical target adapted to move in a predetermined direction in response to changes in a process condition, comprising:

a camera mountable near the target for generating a composite video signal including the target and a region extending along said predetermined direction from the target;

a video signal converter associated with the camera, including means for separating the video signal into horizontal and vertical digital data points associated with arbitrary horizontal and vertical axes in the camera, the horizontal data points and the vertical data points being spaced apart by a horizontal unit pitch and a vertical unit pitch, respectively, orientation means for aligning one of the arbitrary axes with the predetermined direction of target movement, calibration means for establishing a quantitative relation between the unit pitch of the video signal data points along said one aligned axis and a known distance along said predetermined direction;

means for counting the number of digital data points between a reference position of the target and a displaced position of the target on said aligned axis along said predetermined direction, and means responsive to the calibration means and the means for counting, for generating a converter output signal commensurate with said displaced position of the target.

2. The apparatus of claim 1, including a video monitor coupled to the converter, for displaying the image of the target and region from said video signal, and wherein said converter includes means for generating a calibration line that is visible in the monitor and which indicates the location of said one aligned axis relative to the direction of movement of the target.

3. The apparatus of claim 1, wherein one said aligned axis is vertical, the horizontal data points are in the form of a plurality of vertically spaced apart horizontal scan lines, and the means for counting the number of digital data points includes means for counting scan lines in the video signal between said reference position and said displaced position.

4. The apparatus of claim 3, wherein said converter includes, means for horizontally delaying the scan at said aligned vertical axis and means for vertically delaying the scan at each data point on said aligned vertical axis, and data latch means coupled to the means for horizontally delaying the scan, for sequentially identifying and storing a binary value associated with each data point on said aligned vertical axis as the video signal is scanned, and the means for counting is coupled to the means for vertically delaying the scan.

5. The apparatus of claim 1, wherein the target is a float member on a fluid flow gauge.

6. The apparatus of claim 5, wherein the gauge is a flow rotameter.

7. The apparatus of claim 4, wherein the target is a float member on a fluid flow gauge.

8. The apparatus of claim 7, wherein the gauge is a flow rotameter.

9. A method for measuring the linear displacement of a physical target adapted to move in a predetermined direction in response to changes in a process condition, comprising:

mounting a black and white camera so that the field of view includes the target and the region surrounding the target along said predetermined direction;

generating a composite video signal from the camera;

separating the video signal into digitized horizontal rows and vertical columns of data points;

aligning one vertical column of digitized data points with the line of movement of the target;

counting the number of vertical data points between a reference position of the target and a displaced position of the target as the target moves in response to changes in the process; and generating an output signal commensurate with the counted data points.

* * * * *